(12) United States Patent
Webber (10) Patent No.: US 11,457,618 B2
(45) Date of Patent: Oct. 4, 2022

(54) SYSTEM AND METHOD FOR ATTACHING FISHING REEL TO FISHING ROD AND SELECTIVELY POSITIONING THE REEL ALONG THE AXIS OF THE FISHING ROD

(71) Applicant: Karl B. Webber, Tekoa, WA (US)

(72) Inventor: Karl B. Webber, Tekoa, WA (US)

(\*) Notice: Subject to any disclaimer, the term of this patent is extended or adjusted under 35 U.S.C. 154(b) by 168 days.

(21) Appl. No.: 16/714,736

(22) Filed: Dec. 14, 2019

(65) Prior Publication Data

US 2020/0187474 A1 Jun. 18, 2020

Related U.S. Application Data

(60) Provisional application No. 62/780,220, filed on Dec. 15, 2018.

(51) Int. Cl.
*A01K 89/015* (2006.01)
*A01K 87/08* (2006.01)

(52) U.S. Cl.
CPC ........ *A01K 89/01925* (2015.05); *A01K 87/08* (2013.01)

(58) Field of Classification Search
CPC ...... A01K 87/06; A01K 87/007; A01K 87/08; A01K 87/00
USPC .............................. 43/18.1 R, 20, 22, 23, 25
See application file for complete search history.

(56) References Cited

U.S. PATENT DOCUMENTS

| | | | | |
|---|---|---|---|---|
| 4,821,447 A | * | 4/1989 | Nakayama | A01K 87/06 156/188 |
| 6,397,511 B1 | * | 6/2002 | Atnip | A01K 87/007 43/22 |
| 7,089,699 B2 | * | 8/2006 | Borgeat | A01K 87/06 43/18.1 CT |
| 7,159,355 B2 | * | 1/2007 | Muroi | A01K 87/06 43/22 |
| 7,784,214 B2 | * | 8/2010 | Mullane | A01K 87/06 43/22 |
| 2014/0115946 A1 | * | 5/2014 | Manley | A01K 87/02 43/18.1 CT |
| 2017/0112113 A1 | * | 4/2017 | Huang | A01K 87/02 |

\* cited by examiner

*Primary Examiner* — Brady W Frazier
*Assistant Examiner* — Jodutt Basrawi
(74) *Attorney, Agent, or Firm* — Daniel Beitey (57) ABSTRACT

Systems and methods are disclosed herein for providing a fishing rod and reel assembly with an easily adjustable rod balance adjustment. The system includes a fishing rod having a handle section. Positioned adjacent to the handle section is a reel seat body section along which a reel seat frame may securely hold a reel at substantially any position along the reel seat body section to achieve the desired rod balance. Also, the system and method include being able to securely mount and hold a reel to the rod at any position along the reel seat body to achieve any desired balance point location. Thus, a fisher may change reels, spools, line weights, bait, lures or the like and quickly rebalance the rod and reel assembly for an optimal fishing experience.

12 Claims, 7 Drawing Sheets

SYSTEM AND METHOD FOR ATTACHING FISHING REEL TO FISHING ROD AND SELECTIVELY POSITIONING THE REEL ALONG THE AXIS OF THE FISHING ROD

CROSS-REFERENCE TO RELATED APPLICATION

This application claims the benefit of U.S. provisional patent application No. 62/780,220, filed Dec. 15, 2018, titled: System and Method for Attaching Fishing Reel to Fishing Rod and Selectively Positioning the Reel Along the Axis of the Fishing Rod.

FIELD OF THE INVENTION

This invention generally relates to fishing rods and reels and particularly to an adjustable fishing rod/reel system having a variable positioned reel to adjust the rod's balance point for different reel and line combinations.

BACKGROUND

The balance of a fishing rod/reel combination affects a fisherman's ability to cast accurately. Further, the rod/reel balance dictates casting distance and accuracy as well as controlling the rate of fisherman arm fatigue. A properly balanced fishing rod/reel has equal weight both in front of and behind the fisherman's hand such that during casting, a similar effort is used to swing the rod tip and the rod butt around the fulcrum. An unbalanced fishing rod/reel causes the fisherman to vary the cast motion between the cast and retrieval portions of the overall casting process. The unbalanced casting motion yields an inaccurate and reduced distance cast. Further, the additional motions required to make the unbalanced casts cause increased arm fatigue.

Current fishing rod/reel designs employ a static reel seat position yielding only a singular rod/reel balance point. The singular rod/reel balance point may or may not be the ideal balance point location for optimized casting. The static reel position problem is exacerbated when, as is frequently done, a single reel frame but multiple spools/line weights are used. This common practice compounds the limitations with the current designs.

As such, what is needed is a system and method that allows variable reel placement based upon specific rod/reel balance requirements.

SUMMARY

A system for a modular fishing reel assembly is considered. The system includes a longitudinal body defining an axial bore at least partially therethrough. The longitudinal body has an outer surface with at least one longitudinal scallop section formed in the outer surface. Also included is a reel having a spool section configured to control a volume of fishing line. The reel forms a reel base. A reel seat frame extends substantially around a portion of the longitudinal body and has a coaxial center substantially the same as the axial bore. The reel seat frame has a first end and a second end. The reel seat frame having opposed first and second longitudinal cutouts positioned between the first end of the reel seat frame and the second end of the reel seat frame. Also, the first longitudinal cutout is configured to receive the opposed sections of the reel base. An inner surface of the reel seat frame forms a receiving section at substantially the second end of the reel seat frame. The system also includes a sliding locking hood extending over and slidably in communication with the first end of the reel seat frame. The locking hood has an inner surface, a portion of the inner surface forming an increasing restriction section. Further, the system includes a locking nut configured to threadedly engage the first end of the reel seat frame. The locking nut is configured to selectively tighten the reel base within the sliding locking hood, the reel seat frame, and the body into a substantially rigid structure.

Aspects of an embodiment of the current invention also include a modular fishing rod and reel assembly. The assembly includes a fishing rod section and a handle section connected with the rod section. Also included is a longitudinal body connected with the handle section. The longitudinal body defines an axial bore at least partially therethrough. Also, the longitudinal body has an outer surface with at least one longitudinal scallop section formed in the outer surface. Also included is a reel having a spool section configured to control a volume of fishing line. The reel has a reel base. Also, a reel seat frame extending substantially around a portion of the longitudinal body and has a coaxial center substantially the same as the axial bore. The reel seat frame has a first end and a reel seat frame second end. The reel seat frame having opposed first and second longitudinal cutouts positioned between a first end of the reel seat frame and a second end of the reel seat frame. The first longitudinal cutout is configured to receive the opposed sections of the reel base. An inner surface of the reel seat frame forms a receiving section at substantially the second end of the reel seat frame. Also included is a sliding locking hood that extends over and is slidably in communication with the first end of the reel seat frame. The locking hood has an inner surface, a portion of the inner surface forming an increasing restriction section. Further, a locking nut is configured to threadedly engage the first end of the reel seat frame. The locking nut is configured to selectively tighten the reel base within the sliding locking hood, the reel seat frame, and the body into a substantially rigid structure.

An aspect of an embodiment of the present invention includes a method for varying the balance point on a fishing rod. The method includes providing a fishing rod having a handle. Providing a longitudinal body connected with the handle section, the longitudinal body defining an axial bore at least partially therethrough. The longitudinal body having an outer surface with at least one longitudinal scallop section formed in the outer surface. The method further includes providing a reel having a spool section configured to control a volume of fishing line, the reel having a reel base. Also, providing a reel seat frame extending substantially around a portion of the longitudinal body and having a coaxial center substantially the same as the axial bore the reel seat frame having a first end and a reel seat frame second end. The reel seat frame having opposed first and second longitudinal cutouts positioned between a first end of the reel seat frame and a second end of the reel seat frame. The first longitudinal cutout is configured to receive the opposed sections of the reel base opposed longitudinal sections. Also, an inner surface of the reel seat frame forms a receiving section at substantially the second end of the reel seat frame. The method further includes providing a sliding locking hood extending over and slidably in communication with the first end of the reel seat frame. The locking hood has an inner surface and a portion of the inner surface forms an increasing restriction section. Additionally, providing a locking nut configured to threadedly engage the first end of the reel seat frame. The locking nut is configured to selectively tighten the reel base within the sliding locking hood, the reel seat frame, and the body into a substantially rigid structure at substantially any location along the body.

DETAILED DESCRIPTION

In the following detailed description, reference is made to the accompanying drawings that form a part hereof, and in which is shown by way of illustration, specific embodiments in which the invention may be practiced. These embodiments are described in sufficient detail to enable those skilled in the art to practice the invention, and it is to be understood that other embodiments may be utilized. It is also to be understood that structural, procedural and system changes may be made without departing from the spirit and scope of the present invention. In addition, well-known structures and techniques have not been shown in detail in order not to obscure the understanding of this description. The following detailed description is, therefore, not to be taken in a limiting sense, and the scope of the present invention is defined by the appended claims and their equivalents.

As used in the specification and in the appended claims, the singular forms "a", "an", and "the" include plural referents unless the context clearly indicates otherwise. Although specific terms are employed herein, they are used in a generic and descriptive sense only and not for purposes of limitation. All terms, including technical and scientific terms, as used herein, have the same meaning as commonly understood by one of ordinary skill in the art to which this invention belongs unless a term has been otherwise defined. It will be further understood that terms, such as those defined in commonly used dictionaries, should be interpreted as having a meaning as commonly understood by a person having ordinary skill in the art to which this invention belongs. It will be further understood that s, such as those defined in commonly used dictionaries, should be interpreted as having a meaning that is consistent with their meaning in the context of the relevant art and the present disclosure. Such commonly used terms will not be interpreted in an idealized or overly formal sense unless the disclosure herein expressly so defines otherwise. To provide an overall understanding of the invention, certain illustrative embodiments will now be described, including systems and methods for balancing a fishing rod and reel assembly for optimal use. This system and method are also used to provide improved casting distance and accuracy while reducing fisherman arm fatigue during repeated casting efforts. However, it will be understood by one of ordinary skill in the art that the systems and methods described herein may be adapted and modified as is appropriate for the application being addressed and that the systems and methods described herein may be employed in other suitable applications, and that such other additions and modifications will not depart from the scope thereof. In all FIGURES, like numbers means like parts.

The various embodiments described herein provide benefit to any fisherman. The ability to selectively position the reel along the axis of the rod based upon rod/reel balance optimization needs allows for a more comfortable casting stroke. Further, the same improve casting accuracy and distance all while reducing arm fatigue. While it is appropriate for all types and styles of fishing rod and reel combinations, it has a profound effect on a fly fishing rod and reel assemblies. It is employable in both saltwater and freshwater fishing environments.

With specific reference to FIGS. 1-10, a description of various embodiments will be discussed. A fishing rod/reel assembly 100 is depicted. The fishing rod/reel assembly 100 includes at least one-rod section (not shown), a handle 120, a body 102, a reel seat frame 104, a locking hood 106, a locking nut 108, end cap 110 (optional), reel 114, spool 116, and reel base 118 working together to provide a substantially infinitely variable rod/reel balancing system. The various components interact to create an ability to attach a reel 114 to a fishing rod/reel assembly 100 securely while allowing a user to subsequently relocate the reel 114 to any preferred position along length of the body 102 to achieve a desired rod/reel balance and then quickly resecure the assembly to the new position. The user is then able to use the optimally balance rod/reel assembly 100.

With specific reference to FIGS. 1-4, various aspects of an embodiment are discussed. Specifically, the body 102 the surface for which the reel 114 can be positioned along the axis of the fishing rod/reel assembly 100. In an embodiment, the body 102 is connected with the handle 120 via an axial bore and rod blank 122 configurations as illustrated. The various components may then be secured together via adhesive or the like. Further, other methods of attaching the handle 120 to the body 102 are considered within the scope of this invention.

Figure 1:
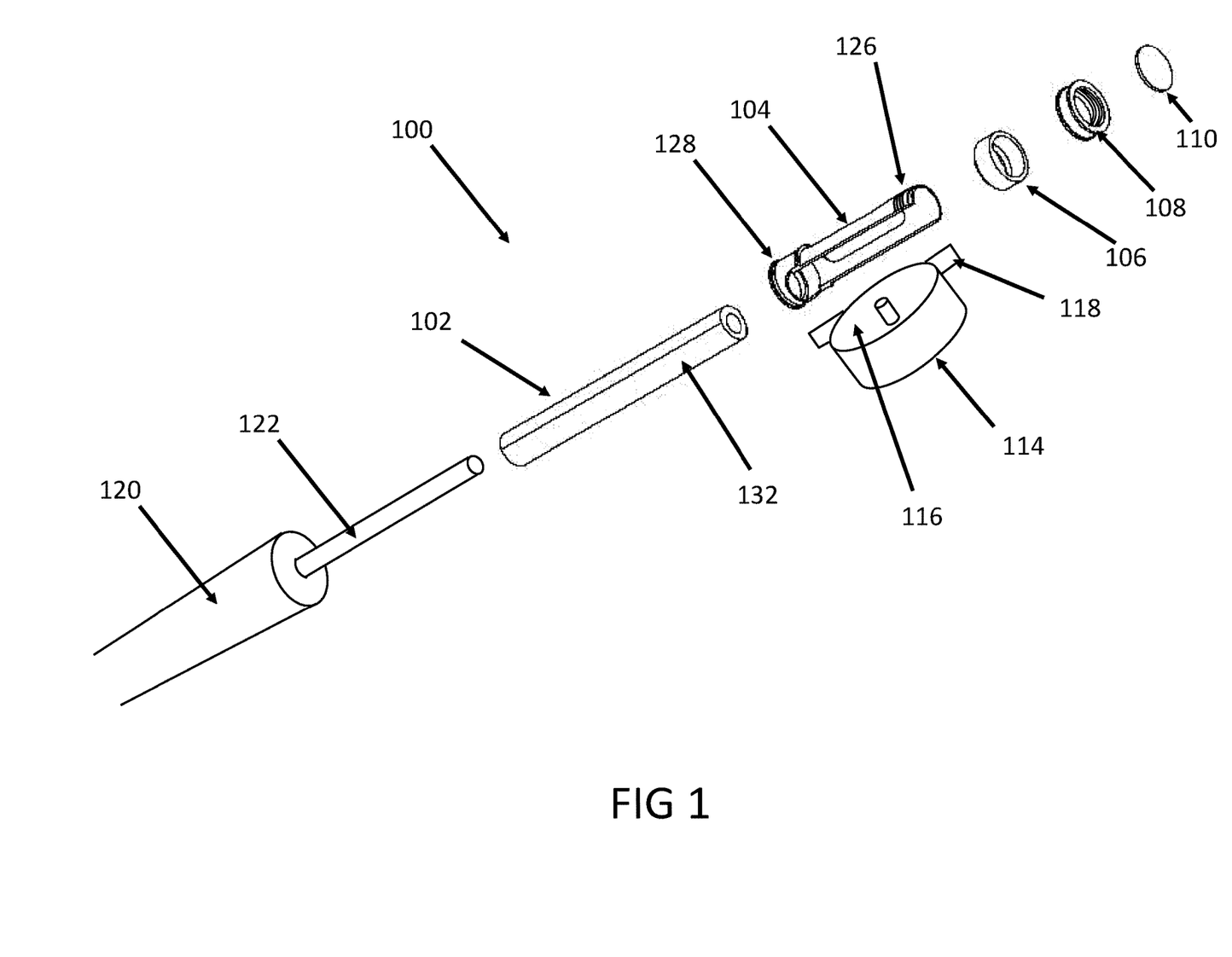
FIG. 1 is an exploded isometric illustration of a fishing rod/reel system according to an illustrative embodiment of the invention.
Figure 2:
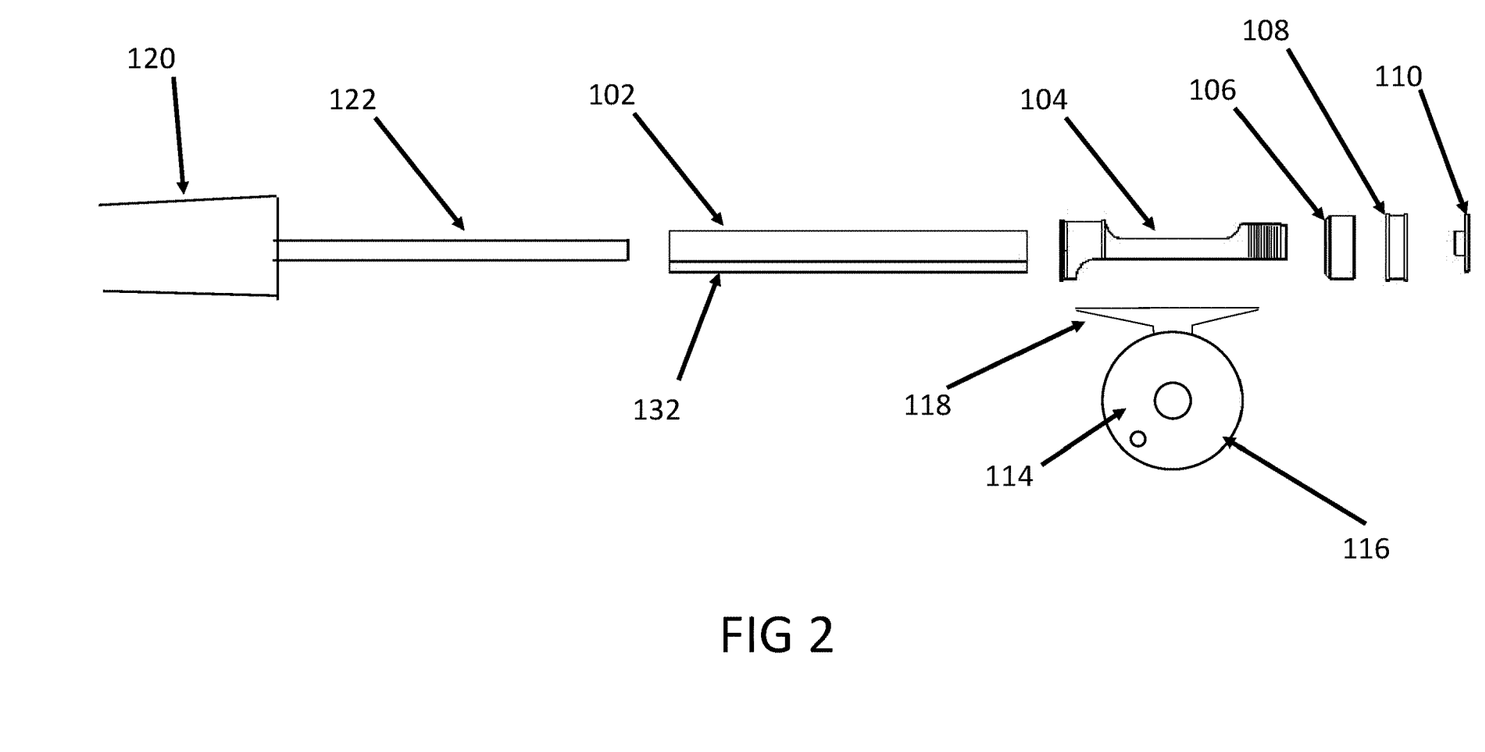
FIG. 2 is a side exploded view of the fishing rod/reel system as used in FIG. 1, according to an illustrative embodiment of the invention.
Figure 3:
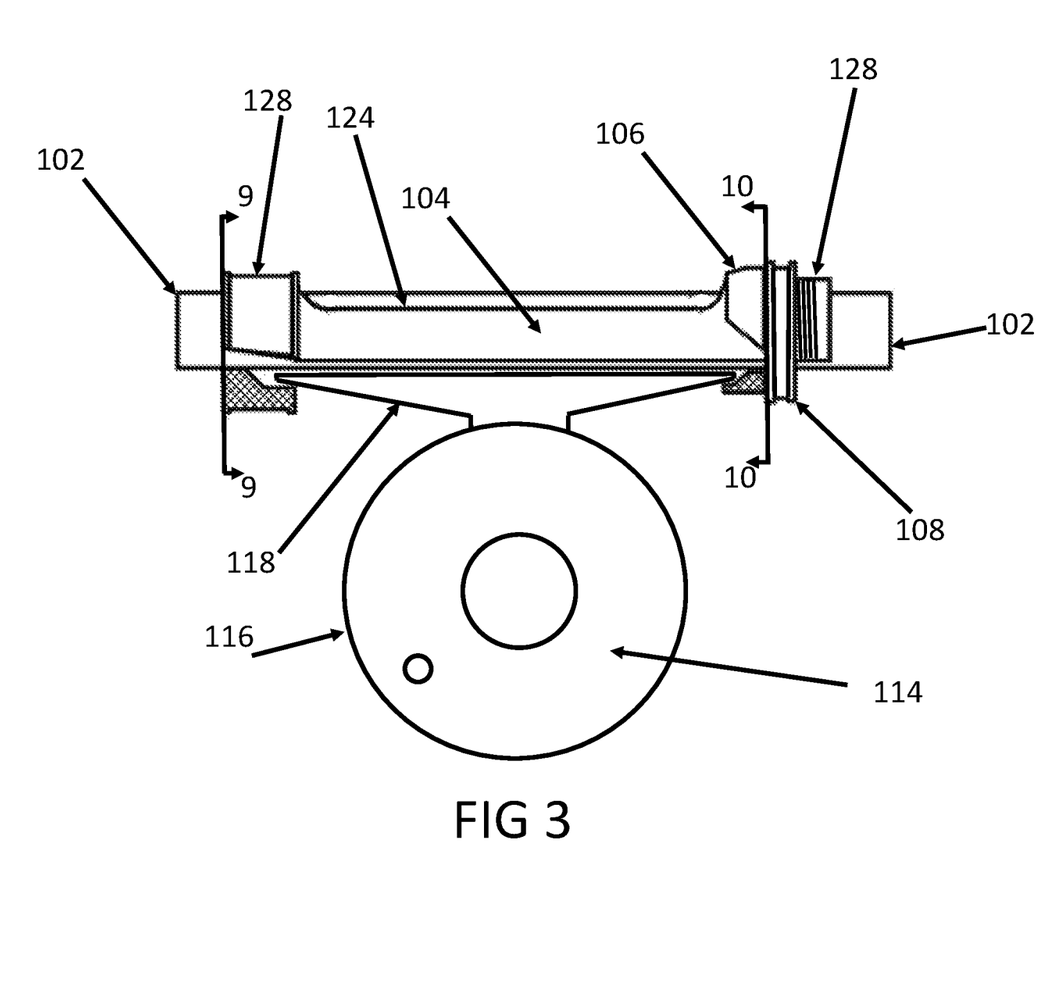
FIG. 3 is a side view of an aspect of the fishing rod/reel system as used in FIG. 1, according to an illustrative embodiment of the invention.
Figures 4, 5:
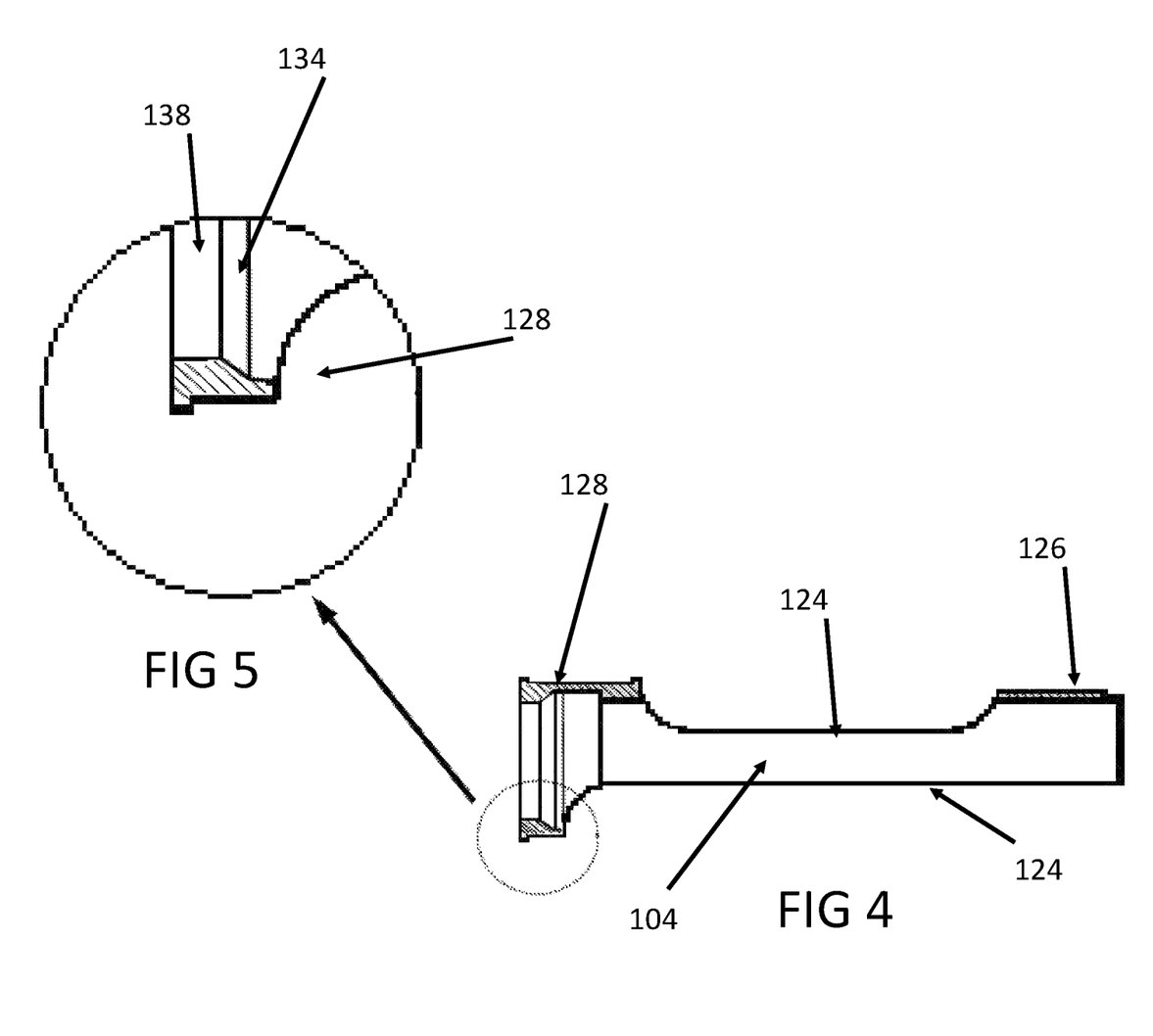
FIG. 4 is a side sectional view of an aspect of the fishing rod/reel system as used in FIG. 1, according to an illustrative embodiment of the invention.
FIG. 5 is an enlarged side sectional view of an aspect of the fishing rod/reel system as used in FIGS. 1 and 4, according to an illustrative embodiment of the invention.
Figures 6, 7:
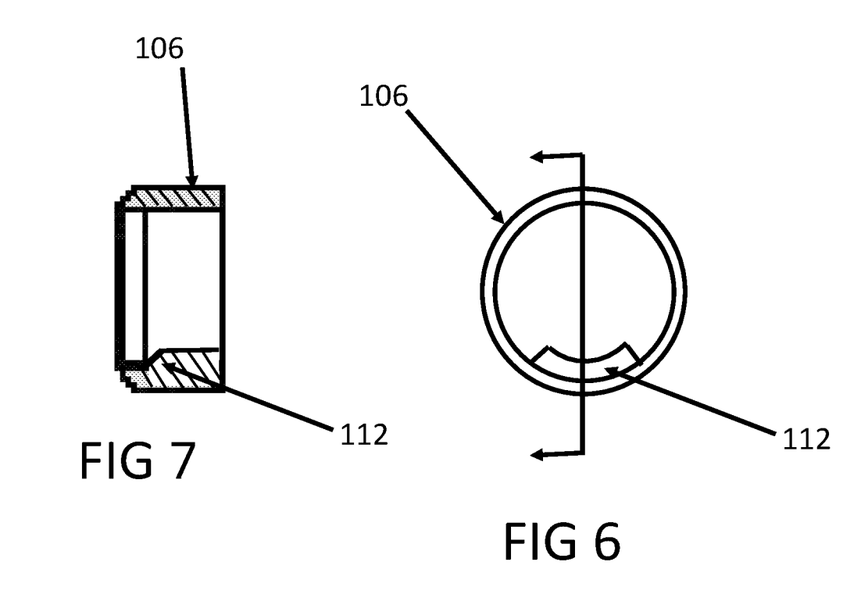
FIG. 6 is an end view of a locking hood aspect of the fishing rod/reel system as used in FIG. 1, according to an illustrative embodiment of the invention.
FIG. 7 is a side sectional view of an aspect of the sliding frame of the fishing rod/reel system as used in FIG. 1, according to an illustrative embodiment of the invention.
Figure 8:
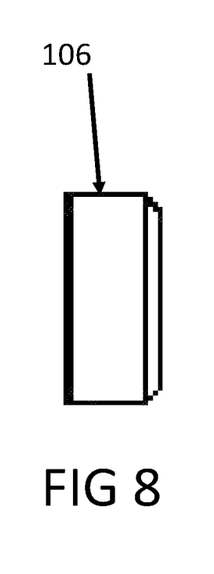
FIG. 8 is a side view of an aspect of the fishing rod/reel system as used in FIG. 1, according to an illustrative embodiment of the invention.
Figure 9:
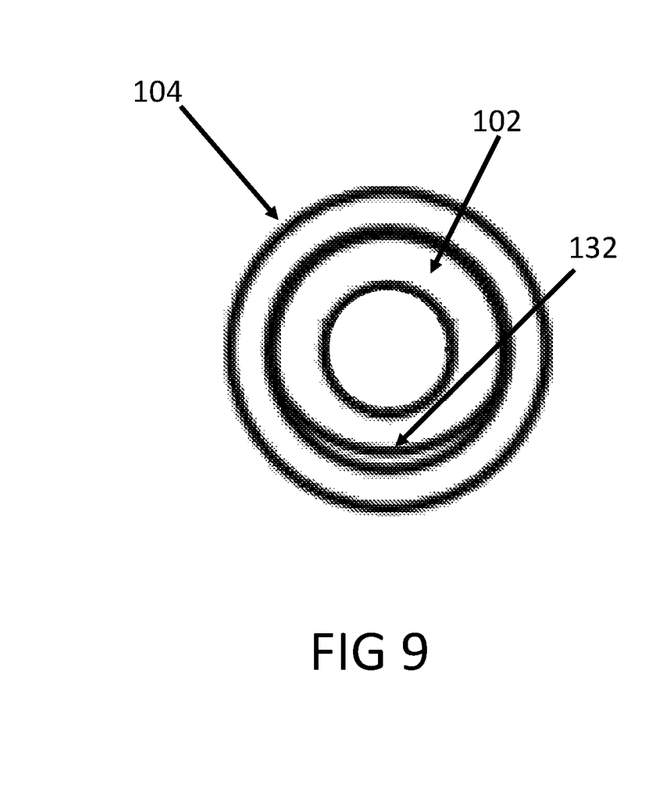
FIG. 9 is an end view of an aspect of the body, sliding frame, and locking hood of the fishing rod/reel system as used in FIG. 1, according to an illustrative embodiment of the invention.
Figure 10:
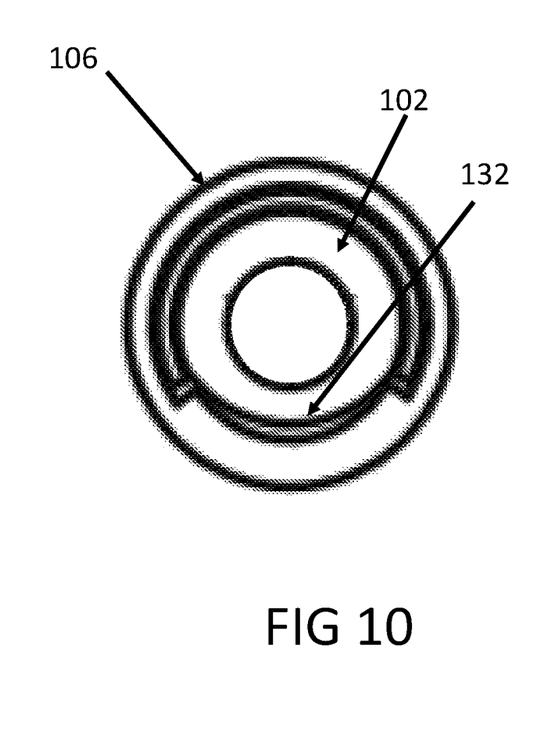
FIG. 10 is an end view of an aspect of the body, sliding frame, and locking hood of the fishing rod/reel system as depicted in FIG. 1, according to an illustrative embodiment of the invention; and, FIG. 11a-11c are side views of an aspect of the fishing rod/reel system as used in FIG. 1, according to an illustrative embodiment of the invention.

As best seen in FIGS. 1, 9 and 10, a portion of the outer surface of the body 102 may have a groove or flat surface (scallop) 132 formed on a portion of the outer surface of the body 102. The scallop 132 may be sized equivalent to or wider than the width of the part of the reel base 118 such that the scallop 132 regions may be used as part of an attachment point for the reel 114. In particular, the scallop 132, when used in conjunction with other components in a manner described below, allows for the reel base 118 to slide between the body 102 and the reel seat frame 104 at a first end of the reel seat frame 128. Also, it allows another gap for the opposed portion of the reel base 118 to slide between this the body 102 and the reel seat frame 104 at a second end of the reel seat frame 126 when in the assembled condition. All can be secured in place by the locking hood 106 and locking nut 108. This scallop section 132 and other components will not allow the reel 114 to move rotationally around the body, thus maintaining the reel 114 in the correct rotational position for use.

In an alternative embodiment, the scallop section 132 may be smaller and insufficient on its own to create a space large enough for the reel base 118. In this embodiment, an additional, corresponding scallop section (not shown) in the reel seat frame 104 and/or locking hood 106 can be employed to achieve the desired outcome.

Additionally or alternatively, the body 102 may not have any scallop section 132 or very little, and a corresponding scallop section (not shown) in ether or both of the corresponding section of the reel seat frame 104 and/or locking hood 106. Likewise, various combinations of the above designs may be employed without departing from the spirit and scope of this disclosure.

Reel seat frame 104 is typically a tubular section with a cutout 124 on one length of the reel seat frame 104 and on the other side of the reel seat frame, 104 is cutout 124 over the majority of its length. As discussed above, when assembled, the reel seat frame 104 is over a portion of the body 102 and creates a gap between the body 102 and the inside diameter of the reel seat frame first end 128. This gap allows for one end of the reel base 118 to be inserted and secured at that location. The remaining length of the reel seat frame 104 has a cutout 124 on the underside that is wider than the reel base 118. This allows the reel base 118 to be mated with the body 102. The reel seat from the second end 126 is threaded to accept the locking nut 108.

In an alternative embodiment, the upper cutaway may be of any desired shape. Additionally, there could be no upper cutout 124 at all. The size, shape, configuration, and/or existence of an upper cutout 124 is not limiting to this disclosure.

The locking hood 106 has an inside diameter that is large enough to provide a slip fit over the reel seat frame 104. When the locking hood 106 is placed over the reel seat frame 104, due to the lower cutout 124, there is a gap created between the locking hood 106 and the scallop section 132 of body 102. In a similar fashion as described above, this gap will allow for one side of the reel base 118 to be fitted. When the locking hood 106 is pushed further onto the real seat frame 104, an interference fit is created, and the reel base 118 is forced tightly against the scallop section 132 of body 102. This interference fit will securely attach the fishing reel onto the fishing rod.

In an embodiment, the interference fit is created/aided by a restriction section 112 on a portion of the inside diameter of the locking hood 106. In operation, the restriction section 112 aligns with the lower cut out 124 of the reel seat frame 104. This restriction section creates a tighter fit against the reel base 118 and creates an alignment between the locking hood 106 and the reel seat frame 104.

As depicted in the FIGS, the restriction section 112 is shown as a ramp type structure. However, this is not intended to be a limiting feature as other geometries may be employed. For example, the restriction section 112 may be completely or partially round. Likewise, it may be steeper, shallower, longer or shorter. It may be multiple sections as well.

The locking nut 108 has an internal thread that mates with the external threads of the reel seat frame 104 and functions as similar structures routinely do. The locking hood 106 is positioned over the reel seat frame 104 and ahead of the locking nut 108 in the assembled state. With a reel base 118 inserted between the body 102 and the reel seat frame 104 and between the body 102 and the locking hood 106, when the locking nut 108 is tightened using the threads, this will force the locking hood 106 forward and increase the force of the interference fit securely attaching the fishing reel to the fishing rod. When loosened the appropriate amount, the reel 114 will remain attached to the fishing rod, but the assembly of the reel seat frame 104, the locking hood 106, the locking nut 108 and the fishing reel can be slid in either direction along the axis of the fishing rod to a selected position.

The end cap 110 is optional. It functions as any type is a component used on many current reel attachment assemblies. In short, it serves the purpose of not allowing a reel and the attachment components to slide off the end of the fishing rod.

An embodiment utilizes the addition of the end cap 110 is affixed to body 102 on one end for the traditional setup of a fly fishing rod. The attachment of the end cap 110 helps the other components to keep the reel from sliding off the end of the rod.

In an alternative embodiment, the end cap 110 is replaced in function by having a larger section of the body 102 portions at the end cap 110 location to prevent slide off.

Alternatively or additionally, an additional section of the handle 120 may be affixed at the end of the body to help secure the components and prevent slide off. Other configurations are considered within the scope of this disclosure and are not intended to be limiting in any way.

Figure 11A:
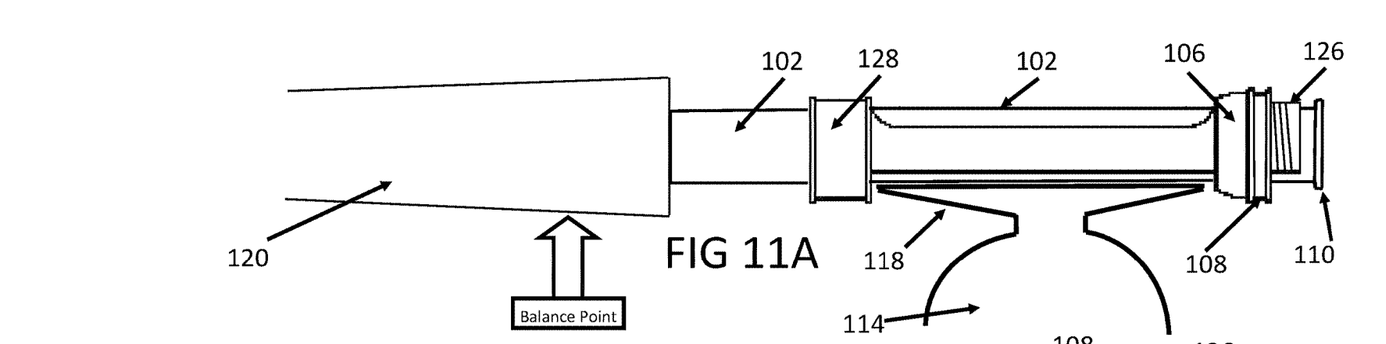
Figures 11B, 11C:
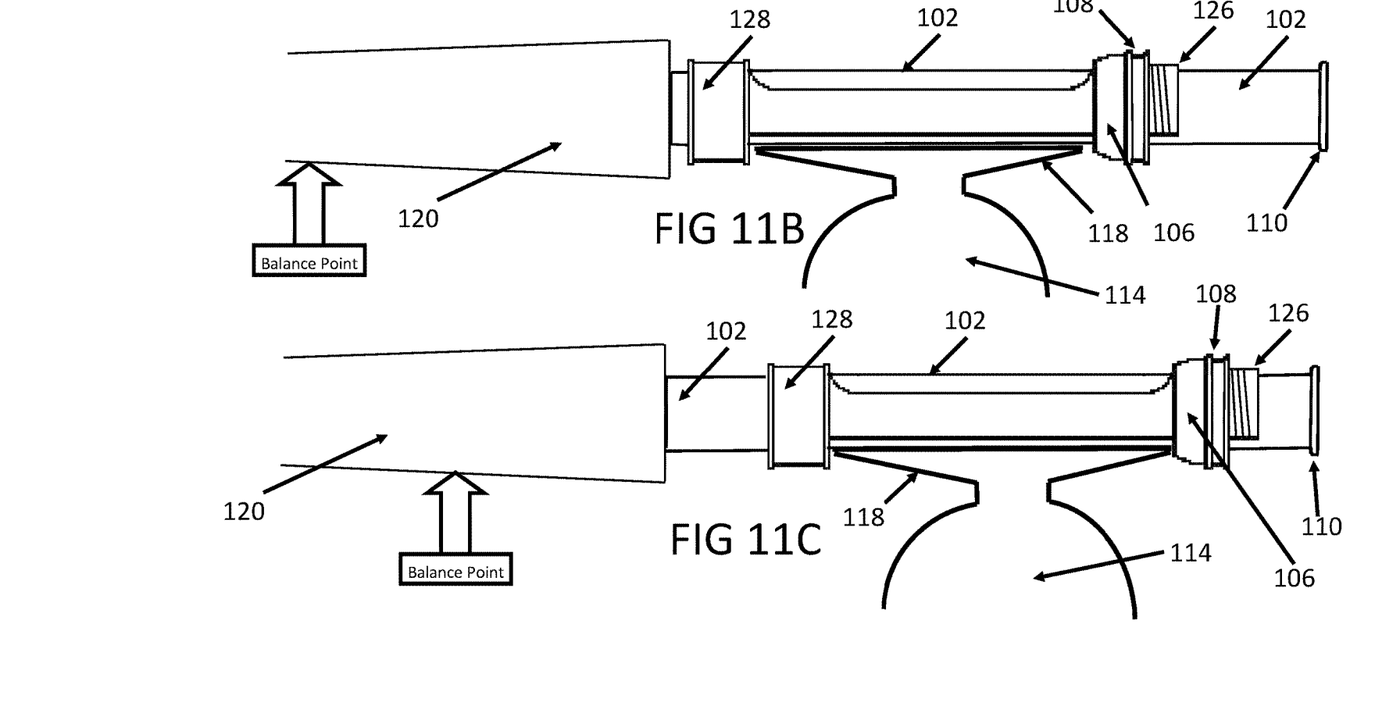

With specific reference to FIGS. 11a-11c, an aspect of the overall benefit of this disclosure is shown. In particular, it is shown how, in a general, non-limiting fashion, how the position of the reel 114 and parts of the locking assembly directly affect the center of balance (or center of gravity) of the rod. In short, moving the reel 114, etc., position along the body 102 changes the center f balance for the entire rod/reel assembly 100.

To move or remove the reel 114 from the rod/reel assembly 100, an individual merely loosens the locking nut 108 until it separates from the reel seat frame 104. The locking hood 106 is slid back off of the reel seat frame 104 allowing moving or removal of the reel 114. Conversely, as discussed above, attaching the reel 114 to the rod/reel assembly 100 is a simple matter. The reel base 118 is inserted into the gap between the body 102 and the reel seat frame 104. The locking hood 106 is slid forward over the reel seat frame 104 and the reel base 118. The locking nut 108 is threaded onto the reel seat frame 104 and tightened snugly. The whole assembly is slid forward or backward along the body 102 until the desired position is achieved. The locking nut 108 is tightened firmly to securely attach in position.

The fisherman can position the reel 114 at an initial balance point and slide the entire assembly along the body 102 to find the desired balance point for optimal fishing performance. Should the fisherman decide to change out spool weights, line weights, lure, bait, etc., the overall balance point may shift, respectfully. If such is the case, the fisherman merely loosens the locking nut 108 sufficient to allow the reel 114 and assembly to slide to a new desired location along the body 102. Once the new balance location is determined, the locking nut 108 is tightened and the reel 114 and associated assemblies are rigidly attached and optimal fishing may commence once again.

While various embodiments of the present invention have been shown and described herein, it will be obvious to those skilled in the art that such embodiments are provided by way of example only. Numerous variations, changes, and substitutions will now occur to those skilled in the art without departing from the invention. It should be understood that various alternatives to the embodiments of the invention described herein may be employed in practicing the invention. It is intended that the following claims define the scope of the invention and that methods and structures within the scope of these claims and their equivalents be covered thereby.

What is claimed is:

1. A modular fishing reel assembly, comprising:
   a longitudinal body defining an axial bore at least partially therethrough, the longitudinal body having an outer surface with at least one longitudinal scallop section formed in the outer surface, and extending along a length of the longitudinal body;
   a reel having a spool section configured to control a volume of fishing line, the reel having a reel base;
   a reel seat frame extending substantially around a portion of the longitudinal body and having a coaxial center substantially the same as the axial bore the reel seat frame having a first end and a reel seat frame second end, the reel seat frame having opposed first and second longitudinal cutouts positioned between a first end of the reel seat frame and a second end of the reel seat frame, the first longitudinal cutout being configured to receive the opposed sections of the reel base at opposed longitudinal sections, an inner surface of the reel seat frame forming a receiving section at substantially the second end of the reel seat frame;
   a sliding locking hood extending over and slidably in communication with the first end of the reel seat frame, the locking hood having an inner surface, a portion of the inner surface forming restriction section;
   a locking nut configured to threadedly engage a first end of the reel seat frame, the locking nut being configured to selectively tighten the reel base within the sliding locking hood, the reel seat frame, and the body into a substantially rigid structure wherein the modular fishing reel assembly may be positioned at substantially any location along the longitudinal body and may be locked in place with the locking nut.

2. A modular fishing rod and reel assembly, comprising:
   a fishing rod section;
   a handle section connected with the rod section;
   a longitudinal body connected with the handle section, the longitudinal body defining an axial bore at least partially therethrough, the longitudinal body having an outer surface with at least one longitudinal scallop section formed in the outer surface and extending along a length of the longitudinal body;
   a reel having a spool section configured to control a volume of fishing line, the reel having a reel base;
   a reel seat frame extending substantially around a portion of the longitudinal body and having a coaxial center substantially the same as the axial bore the reel seat frame having a first end and a reel seat frame second end, the reel seat frame having opposed first and second longitudinal cutouts positioned between a first end of the reel seat frame and a second end of the reel seat frame, the first longitudinal cutout being configured to receive the opposed sections of the reel base at opposed longitudinal sections, an inner surface of the rear seat frame forming a receiving section at substantially the second end of the reel seat frame;
   a sliding locking hood extending over and slidably in communication with the first end of the reel seat frame, the locking hood having an inner surface, a portion of the inner surface forming an increasing restriction section;
   a locking nut configured to threadedly engage a first end of the reel seat frame, the locking nut being configured to selectively tighten the reel base within the sliding locking hood, the reel seat frame, and the body into a substantially rigid structure wherein the modular fishing reel assembly may be positioned at substantially any location along the longitudinal body and may be locked in place with the locking nut.

3. A method for varying the balance point on a fishing rod, the method comprising:
   providing a fishing rod having a handle section;
   providing a longitudinal body connected with the handle section, the longitudinal body defining an axial bore at least partially therethrough, the longitudinal body having an outer surface with at least one longitudinal scallop section formed in the outer surface and extending along a length of the longitudinal body;
   providing a reel having a spool section configured to control a volume of fishing line, the reel having a reel base;
   providing a reel seat frame extending substantially around a portion of the longitudinal body and having a coaxial center substantially the same as the axial bore the reel seat frame having a first end and a reel seat frame second end, the reel seat frame having opposed first and second longitudinal cutouts positioned between a first end of the reel seat frame and a second end of the reel seat frame, the first longitudinal cutout being configured to receive the opposed sections of the reel base at opposed longitudinal sections, an inner surface of the real seat frame forming a receiving section at substantially the second end of the reel seat frame;
   providing a sliding locking hood extending over and slidably in communication with the first end of the reel seat frame, the locking hood having an inner surface, a portion of the inner surface forming an increasing restriction section;
   providing a locking nut configured to threadedly engage a first end of the reel seat frame, the locking nut being configured to selectively tighten the reel base within the sliding locking hood, the reel seat frame, and the body into a substantially rigid structure wherein the modular fishing reel assembly may be positioned at substantially any location along the longitudinal body and may be locked in place with the locking nut.

4. The assembly of claim 1, wherein the at least one longitudinal scallop section runs along substantially the full length of the longitudinal body.

5. The assembly of claim 1, wherein the at least one longitudinal scallop section controls the alignment of the reel, the reel seat frame, and the sliding locking hood of the modular fishing reel assembly.

6. The assembly of claim 1, wherein the at least one longitudinal scallop section is a groove formed in the longitudinal body.

7. The assembly of claim 1, wherein the at least one longitudinal scallop section is a flat surface formed on the longitudinal body.

8. The assembly of claim 2, wherein a change in position of the modular fishing reel assembly along the longitudinal body corresponds to a change in the balance point location of the modular fishing rod and reel assembly.

9. The assembly of claim 8, wherein position of the modular fishing reel assembly along the longitudinal body is selected to reduce a user fatigue.

10. The method of claim 3, wherein the selection of the position of the modular fishing reel assembly along the longitudinal body is selected based upon a desired balance point on the fishing rod.

11. The method of claim 10, wherein the selection of the desired balance point is at least one of a forward balance point, a neutral balance point, and an aft balance point relative to an initial balance point.

12. The method of claim 3, wherein a change in the position of the fishing reel assembly along the longitudinal body is selected based upon a change in the at least one of a reel, spool, line weight, bait, and lure.

* * * * *